(12) United States Patent
Inoguchi (10) Patent No.: US 11,940,623 B2
(45) Date of Patent: Mar. 26, 2024

(54) OBSERVATION OPTICAL SYSTEM AND DISPLAY APPARATUS

(71) Applicant: CANON KABUSHIKI KAISHA, Tokyo (JP)

(72) Inventor: Kazutaka Inoguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 620 days.

(21) Appl. No.: 16/934,411

(22) Filed: Jul. 21, 2020

(65) Prior Publication Data

US 2021/0033868 A1 Feb. 4, 2021

(30) Foreign Application Priority Data

Jul. 29, 2019 (JP) .................. 2019-138509

(51) Int. Cl.
*G02B 27/01* (2006.01)
*G02B 9/14* (2006.01)
*G02B 17/08* (2006.01)

(52) U.S. Cl.
CPC ........... *G02B 27/0172* (2013.01); *G02B 9/14* (2013.01); *G02B 17/0816* (2013.01); *G02B 17/0852* (2013.01); *G02B 17/0856* (2013.01); *G02B 2027/011* (2013.01); *G02B 2027/0116* (2013.01)

(58) Field of Classification Search
CPC ... G02B 9/10; G02B 9/14; G02B 9/18; G02B 9/20; G02B 9/22; G02B 9/24; G02B 9/26; G02B 9/28; G02B 9/30; G02B 13/006; G02B 13/007; G02B 17/0816; G02B 17/0848; G02B 17/0852; G02B 17/0856; G02B 25/001; G02B 27/01; G02B 27/0101; G02B 27/0172; G02B 2027/011; G02B 2027/0116
See application file for complete search history.

(56) References Cited

U.S. PATENT DOCUMENTS

| | | | | |
|---|---|---|---|---|
| 5,436,765 A | * | 7/1995 | Togino | G02B 27/0172 359/434 |
| 5,745,295 A | | 4/1998 | Takahashi | |
| 5,991,103 A | | 11/1999 | Togino | |
| 5,995,291 A | | 11/1999 | Togino | |
| 6,104,537 A | * | 8/2000 | Togino | G02B 17/0848 359/629 |
| 6,128,137 A | * | 10/2000 | Togino | G02B 15/143507 359/637 |

(Continued)

FOREIGN PATENT DOCUMENTS

| | | |
|---|---|---|
| JP | H08076034 A | 3/1996 |
| JP | H08122670 A | 5/1996 |

(Continued)

OTHER PUBLICATIONS

Office Action issued in U.S. Appl. No. 16/934,284 dated Jun. 10, 2021.

(Continued)

*Primary Examiner* — Nicholas R. Pasko
(74) *Attorney, Agent, or Firm* — ROSSI, KIMMS & McDOWELL LLP (57) ABSTRACT

An optical system configured to guide a light beam from a display element includes a positive lens, a negative lens, and an optical element having at least three optical surfaces. The light beam from the display element is reflected a plurality of times inside the optical element via the positive lens and the negative lens, and then travels to an exit pupil. A predetermined condition is satisfied.

8 Claims, 9 Drawing Sheets

(56) References Cited

U.S. PATENT DOCUMENTS

| | | | |
|---|---|---|---|
| 6,147,807 A * | 11/2000 | Droessler | G02B 27/0172 359/633 |
| 6,317,267 B1 | 11/2001 | Takahashi | |
| 6,671,099 B2 * | 12/2003 | Nagata | G02B 13/006 359/629 |
| 6,900,950 B2 * | 5/2005 | Nagata | G02B 13/005 359/720 |
| 7,515,345 B2 * | 4/2009 | Heimer | G02B 27/0172 359/833 |
| 7,894,138 B2 * | 2/2011 | Fujimoto | G02B 27/0172 359/618 |
| 8,289,231 B2 | 10/2012 | Budd et al. | |
| 9,086,569 B1 | 7/2015 | Cakmakci | |
| 2017/0311794 A1 | 11/2017 | Inque | |

FOREIGN PATENT DOCUMENTS

| | | |
|---|---|---|
| JP | H08146341 A | 6/1996 |
| JP | H08313829 A | 11/1996 |
| JP | H09146037 A | 6/1997 |
| JP | H09258104 A | 10/1997 |
| JP | 2000241705 A | 9/2000 |
| JP | 2001242412 A | 9/2001 |
| JP | 2001255489 A | 9/2001 |
| JP | 2002116409 A | 4/2002 |
| JP | 2015175967 A | 10/2015 |
| JP | 2020510238 A | 4/2020 |

OTHER PUBLICATIONS

Notice of Allowance issued in U.S. Appl. No. 16/934,284 dated Sep. 27, 2021.

Office action issued in Japanese Appln. No. 2019-138509 dated May 2, 2023. English translation provided.

Yamamoto. Copending U.S. Appl. No. 16/934,284, filed Jul. 21, 2020.

Office Action issued in Japanese Appln. No. 2019-138510 dated Apr. 18, 2023. English translation provided.

* cited by examiner

OBSERVATION OPTICAL SYSTEM AND DISPLAY APPARATUS

BACKGROUND OF THE INVENTION

Field of the Invention

The present invention relates to an observation optical system suitable for a display apparatus (or observation apparatus), such as a head mount display (HMD).

Description of the Related Art

A thin observation optical system has conventionally been known which enables a wide-angle image to be observed. Japanese Patent Laid-Open No. ("JP") 8-313829 discloses an optical apparatus in which a concave lens joined with an eccentric optical element is disposed between a display element and the eccentric optical element. JP 9-258104 discloses an optical system in which a diffractive optical element (DOE) is disposed between a display element and an eccentric optical element.

However, the optical apparatus disclosed in JP 8-313829 cannot sufficiently correct the curvature of field. In the optical system disclosed in JP 9-258104, the diffractive grating pattern may be visually recognized because the diffractive surface is located near the display surface.

SUMMARY OF THE INVENTION

The present invention provides a compact observation optical system and display apparatus, each of which can satisfactorily correct a chromatic aberration and a curvature of field while preventing an unnecessary pattern from being observed.

An optical system according to one aspect of the present invention configured to guide a light beam from a display element includes a positive lens, a negative lens, and an optical element having at least three optical surfaces. The light beam from the display element is reflected a plurality of times inside the optical element via the positive lens and the negative lens, and then travels to an exit pupil. The following conditional expressions are satisfied:

$$0.28 < nn-np < 0.60$$

$$38 < vp-vn < 80$$

where $np$ and $nn$ are refractive indices of the positive lens and the negative lens for the d-line, respectively, and $vp$ and $vn$ are Abbe numbers of the positive lens and the negative lens for the d-line, respectively.

A display apparatus having the above optical system also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

EXAMPLE 1

Figure 1:
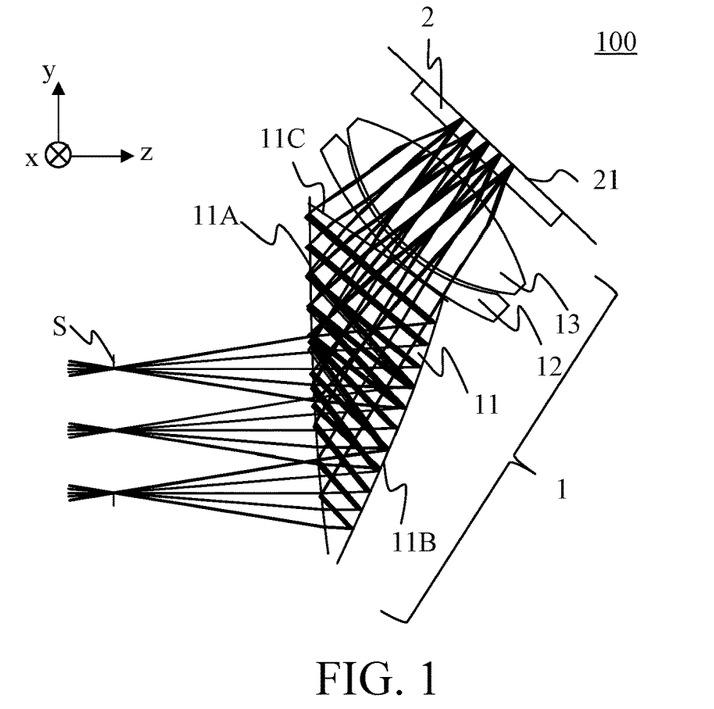
FIG. 1 is a configuration diagram of principal part of an observation apparatus according to Example 1.

A description will now be given of a configuration of an observation apparatus (image display apparatus) according to Example 1 of the present invention. FIG. 1 is a configuration diagram of principal part of an observation apparatus 100 according to this example.

The observation apparatus 100 includes an observation optical system 1 and an image display element 2. The observation optical system 1 is an optical system that guides a light beam from the image display element 2 to an exit pupil, and includes an optical element (such as a free-form surface prism) 11, a concave lens (negative lens) 12, and a convex lens (positive lens) 13. In the optical element 11, an entrance surface, at least one reflection surface, and an exit surface are formed on a medium having a refractive index n>1. Thus, the optical element 11 has at least three optical surfaces (entrance surface, reflection surface, exit surface). An image is displayed on a surface 21 of the image display element 2. S stands for the exit pupil of the observation optical system 1.

The light (image light) emitted from the image display element 2 passes through the convex lens 13 and the concave lens 12, and enters the optical element 11 on an entrance surface 11C. The light that has entered the optical element 11 is reflected by a reflection and transmission surface 11A and a reflection surface 11B, and the optical path is folded inside the optical element 11, and then the light exits from the optical element 11 through the reflection and transmission surface 11A. The light emitted from the optical element 11 is guided to an exit pupil S of the observation optical system 1, and the image displayed on the image display element 2 is displayed as an enlarged virtual image distant from the exit pupil S for an observer who places his pupil near the exit pupil S.

Thus, the observation optical system 1 causes the light beam from the image display element 2 to enter the optical element 11 via the convex lens 13 and the concave lens 12, to be reflected a plurality of times inside the optical element 11 and (after the plurality of eccentric reflections), to exit from the optical element 11, and to enter the observer's pupil without forming an intermediate image.

In the observation optical system 1 according to this example, the concave lens 12 and the convex lens 13 are disposed between the optical element 11 and the image display element 2, and the light passing through the convex lens 13 and the concave lens 12 is guided to the optical element 11. The optical element 11 is an optical element having a positive power (condensing action), and is an optical system in which the reflection surface 11B as a concave mirror has a main power of the condensing action. Therefore, a chromatic aberration is less likely to occur, but the lateral chromatic aberration is more likely to occur than the longitudinal chromatic aberration. Due to the concave lens 12 having a high dispersion disposed between the optical element 11 and the image display element 2 in which the height of a marginal ray becomes lower and the height of a view-angle principal ray becomes higher, the effect of correcting the lateral chromatic aberration is stronger than the effect of correcting the axial chromatic aberration.

Figure 2:
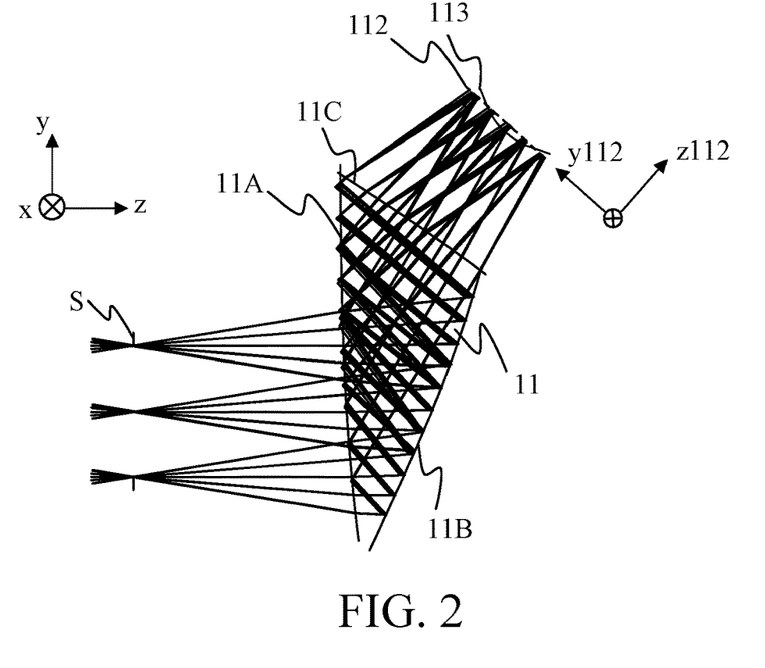
FIG. 2 explains a curvature of field in the optical element according to Example 1.

In order to make longer an eye relief during the observation, if a distance between the optical element 11 and the exit pupil S is made wide, the image plane formed by the optical element 11 tends to be in the overcorrection state when the reverse ray tracing is performed on the display surface side while the exit pupil S is set to the entrance pupil. Referring now to FIG. 2, a description will be given of the curvature of field of the optical element 11 according to this example. FIG. 2 explains the curvature of field of the optical element 11.

An imaging plane 112 is set near a position where the light beam passing through the exit pupil S forms an image by the optical element 11, and the points are found where the peripheral ray passing through the edge of the exit pupil S intersect at the central field angle and the peripheral field angle. At that time, a z coordinate value of the intersection point when a z112 axis is taken in the direction normal to the imaging plane 112 satisfies the peripheral field angle>the central field angle. In other words, an image plane 113 of the optical element 11 is in the overcorrection state. Hence, if only the concave lens 12 for making the image surface 113 be in the overcorrection direction is disposed between the optical element 11 and the image display element 2, the curvature of field is deteriorated. Therefore, the convex lens 13 is disposed to make the image surface 113 be in the undercorrection state and to make the curvature of field. In particular, a medium having a high refractive index may be used for the concave lens 12 and a medium having a low refractive index may be used for the convex lens 13 in order to further generate the curvature of field to the undercorrection side by the convex lens 13 while reducing the generation of the curvature of field to the overcorrection side by the concave lens 12. In other words, the following conditional expression (1) is satisfied where np and nn are refractive indices of the convex lens 13 and the concave lens 12, respectively. The refractive indices np and nn are calculated by the refractive index for the d-line wavelength (587.56 nm).

$$0.28<nn-np<0.60 \quad (1)$$

If the value is lower than the lower limit in the conditional expression (1), the undercorrection effect of the curvature of field in the lens system including the concave lens 12 and the convex lens 13 becomes insufficient. On the other hand, if the value is higher than the upper limit in the conditional expression (1), the undercorrection effect of the curvature of field in the lens system including the concave lens 12 and the convex lens 13 becomes excessive.

If the convex lens 13 is added for the image plane correction, the effect of correcting the lateral chromatic aberration caused by the optical element 11 with the concave lens 12 becomes insufficient. Therefore, the dispersion of the concave lens 12 may be made larger and the dispersion of the convex lens 13 may made lower in order to correct the lateral chromatic aberration in the entire observation optical system 1. In other words, the following conditional expression (2) may be satisfied where vp and vn are Abbe numbers of the convex lens 13 and the concave lens 12, respectively. When the Abbe numbers vp and vn are calculated as follows with a refractive index nF for the F-line wavelength (486.13 nm), a refractive index nd for the d-line wavelength, and a refractive index nC for the C-line wavelength (656.27 nm): v=(nd-1)/(nF-nC).

$$38<vp-vn<80 \quad (2)$$

When the value is lower than the lower limit in the conditional expression (2), the counter lateral chromatic aberration generated in the lens system including the concave lens 12 and the convex lens 13 becomes insufficient for the lateral chromatic aberration caused by the optical element 11. On the other hand, when the value is higher than the upper limit in the conditional expression (2), the counter lateral chromatic aberration generated in the lens system including the concave lens 12 and the convex lens 13 becomes excessive for the lateral chromatic aberration caused by the optical element 11. The axial chromatic aberration becomes also excessive.

The numerical ranges of the conditional expressions (1) and (2) may be set as in the following conditional expressions (1') and (2'), respectively.

$$0.28<nn-np<0.50 \quad (1')$$

$$38<vp-vn<60 \quad (2')$$

Satisfying the conditional expression (1') can more effectively prevent the excessive undercorrection effect of the curvature of field in the lens system. Satisfying the conditional expression (2') can more effectively prevent the excessive correction of the chromatic aberration in the lens system.

The powers φp and φn of the convex lens 13 and the concave lens 12 and the power Φ of the entire system of the observation optical system 1 may satisfy the following conditional expressions (3) and (4).

$$0<(\varphi p/np+\varphi n/nn)/\Phi<0.6 \quad (3)$$

$$-0.03<(\varphi p/vp+\varphi n/vn)/\Phi<0 \quad (4)$$

If the value is lower than the lower limit in the conditional expression (3), the undercorrection effect of the curvature of field in the lens system including the concave lens 12 and the convex lens 13 becomes insufficient. On the other hand, when the value is higher than the upper limit in the conditional expression (3), the undercorrection effect of the curvature of field becomes excessive in the lens system including the concave lens 12 and the convex lens 13.

If the value is lower than the lower limit in the conditional expression (4), the counter lateral chromatic aberration generated in the lens system including the concave lens 12 and the convex lens 13 becomes insufficient for the lateral chromatic aberration caused by the optical element 11. On the other hand, if the value is higher than the upper limit in the conditional expression (4), the counter lateral chromatic aberration generated in the lens system including the concave lens 12 and the convex lens 13 is excessive to the lateral chromatic aberration caused by the optical element 11.

The numerical ranges of conditional expressions (3) and (4) may be set as in the following conditional expressions (3') and (4'), respectively.

$$0.35 < (\varphi p/np + \varphi n/nn)/\Phi < 0.55 \qquad (3')$$

$$-0.025 < (\varphi p/vp + \varphi n/vn)/\Phi < -0.005 \qquad (4')$$

Satisfying the conditional expressions (3') and (4') can more properly correct the curvature of field and the lateral chromatic aberration caused by the optical element 11 with the lens system including the concave lens 12 and the convex lens 13.

In this embodiment, the absolute value of the power of the convex lens 13 may be set to be larger than the absolute value of the power of the concave lens 12. Thus, the divergent light beam from the image display element 2 is converged through the convex lens 13 and the concave lens 12 and guided to the optical element 11, and the optical element 11 can be made compact.

The observation optical system 1 according to this example is an eccentric optical system that includes the eccentric optical element 11 having an optical path that is folded by reflection surfaces (eccentric reflection surfaces) 11A and 11B relative to a field-angle principal ray connecting the image center and the center of the exit pupil S to each other. By folding the optical path by the reflection surfaces 11A and 11B, the observation optical system 1 can be made thinner in the z-axis direction in FIG. 1. The power in the eccentric optical system can be calculated in the same way as is a case where the normal paraxial focal length is calculated, based on the local radius of curvature at the hit point of each surface of the central view-angle principal ray and the optical path length between the hit points. The power Φ of the entire system is calculated based on the thus obtained numerical values. The local radius of curvature is a radius of curvature near the hit point, and there are a radius of curvature ry on the yz section in FIG. 1 and a radius of curvature rx on the section parallel to the xz section. The power Φ of is calculated using the radius of curvature ry on the yz section of each surface. Since the concave lens 12 and the convex lens 13 are coaxial lenses, the powers φp and φn of the convex lens 13 and the concave lens 12 are calculated by the ordinary lens power calculation.

EXAMPLE 2

Figure 3:
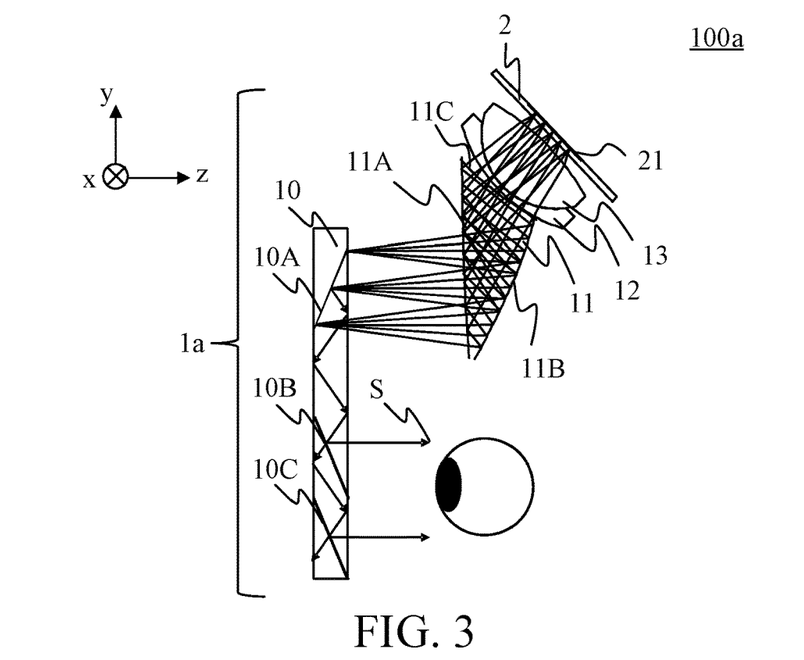
FIG. 3 is a configuration diagram of principal part of an observation apparatus according to Example 2.

Next follows a description of a configuration of an observation apparatus (image display device) according to Example 2 of the present invention. FIG. 3 is a configuration diagram of principal part of an observation apparatus 100a according to this example.

The observation apparatus 100a according to this example is different from the observation apparatus 100 according to Example 1 having the observation optical system 1 having no light guide plate 10 in that it has the observation optical system 1a having the light guide plate 10. The other configuration of the observation apparatus 100a is the same as that of the observation apparatus 100 according to Example 1, and thus a description thereof will be omitted.

The light emitted from the optical element 11 is guided to the light guide plate 10 and is reflected by a reflection surface 10A disposed in the light guide plate 10 and configured to propagate it in the light guide plate 10 by the total reflection. The light propagated by the total reflection in the light guide plate 10 is partially emitted from the light guide plate 10 by reflection surfaces (semi-transmission and reflection surfaces) 10B and 10C disposed in the light guide plate 10, and is guided to the exit pupil S in the observation optical system 1. In other words, the observation optical system 1a allows the light beam from the image display element 2 to enter the light guide plate 10 via the convex lens 13, the concave lens 12, and the optical element 11, and guides the light beam emitted from the light guide plate 10 to the observer's pupil.

Due to this configuration, an image displayed on the image display element 2 can be displayed as an enlarged virtual image distant from the exit pupil S to an observer whose pupil is located near the exit pupil S. The observation optical system 1a according to this embodiment may also satisfy the conditional expressions (1) to (4), as in Example 1.

Referring now to FIGS. 4 to 13, a description will be given of Examples 1 to 5 according to the present invention.

Figure 4:
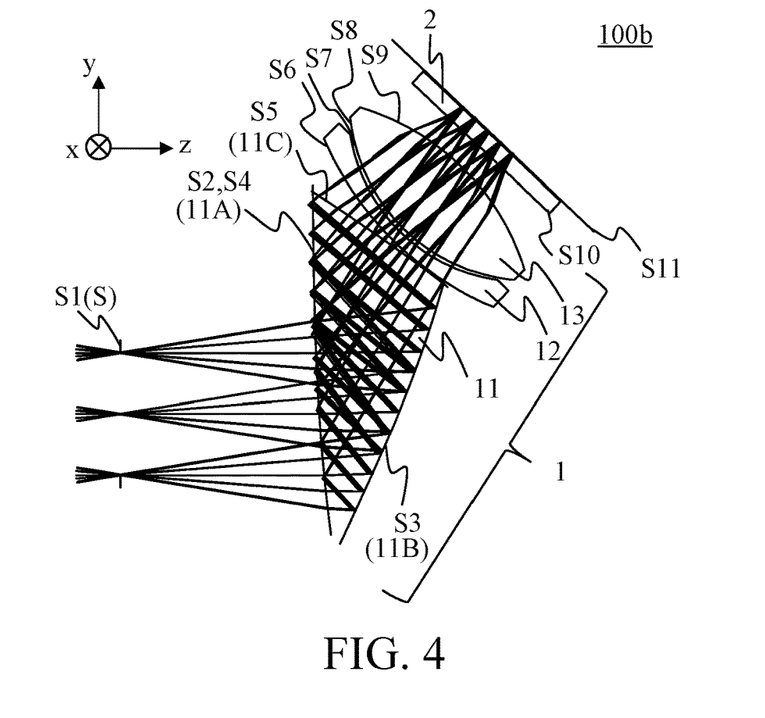
FIG. 4 is a sectional view of the observation apparatus according to Example 1.

FIG. 4 is a sectional view of an observation apparatus 100b according to Example 1. The observation apparatus 100b according to this example includes the optical element 11, the concave lens 12, the convex lens 13, and the image display element 2 arranged in this order. The concave lens 12 is disposed closer to the optical element 11 than the convex lens 13 (or the concave lens 12 is disposed between the optical element 11 and the convex lens 13). Thereby, the principal point position of the lens system including the concave lens 12 and the convex lens 13 is disposed at the back of the lens, so that it becomes easy to secure a space between the convex lens 13 and the image display element 2.

Figure 5:
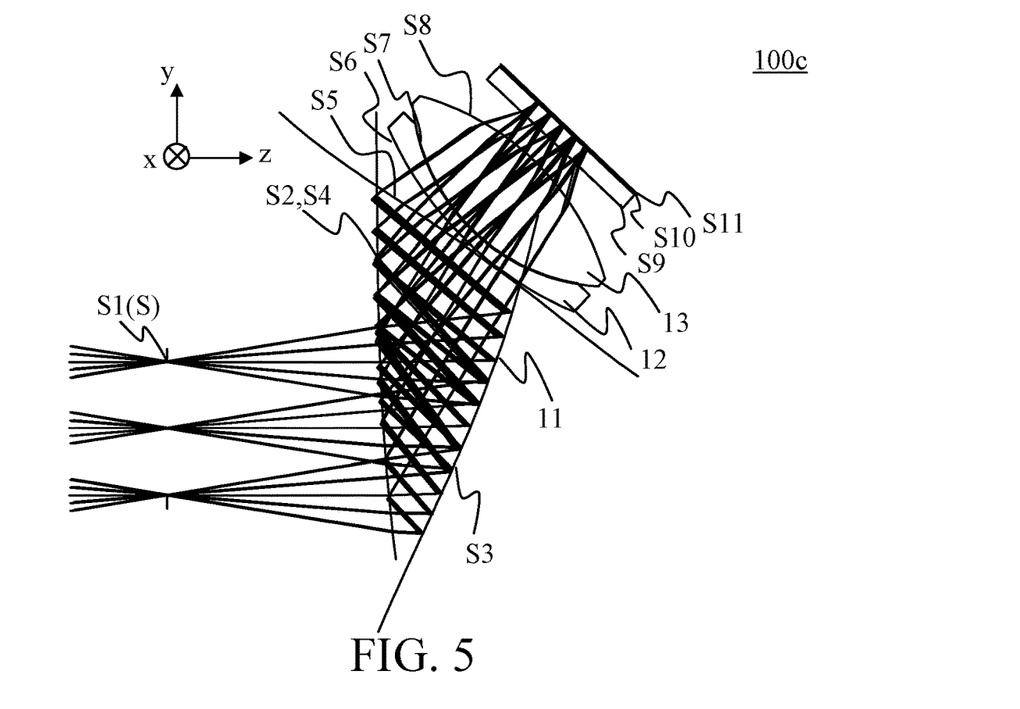
FIG. 5 is a sectional view of an observation apparatus according to Example 2.

FIG. 5 is a sectional view of an observation apparatus 100c according to Example 2. The observation apparatus 100c according to this example includes the optical element 11, the concave lens 12, the convex lens 13, and the image display element 2 arranged in this order. The concave lens 12 is disposed closer to the optical element 11 than the convex lens 13 (or the concave lens 12 is disposed between the optical element 11 and the convex lens 13). Thereby, the principal point position of the lens system including the concave lens 12 and the convex lens 13 is disposed at the back of the lens, so that it becomes easy to secure a space between the convex lens 13 and the image display element 2. The convex lens 13 and the concave lens 12 form a cemented lens in which the convex lens 13 and the concave lens 12 are cemented. Cementing the concave lens 12 and the convex lens 13 provides a compact configuration, and relieves the performance deterioration caused by the light beam shielding due to the total reflection and the shape error of the cemented surface.

Figure 6:
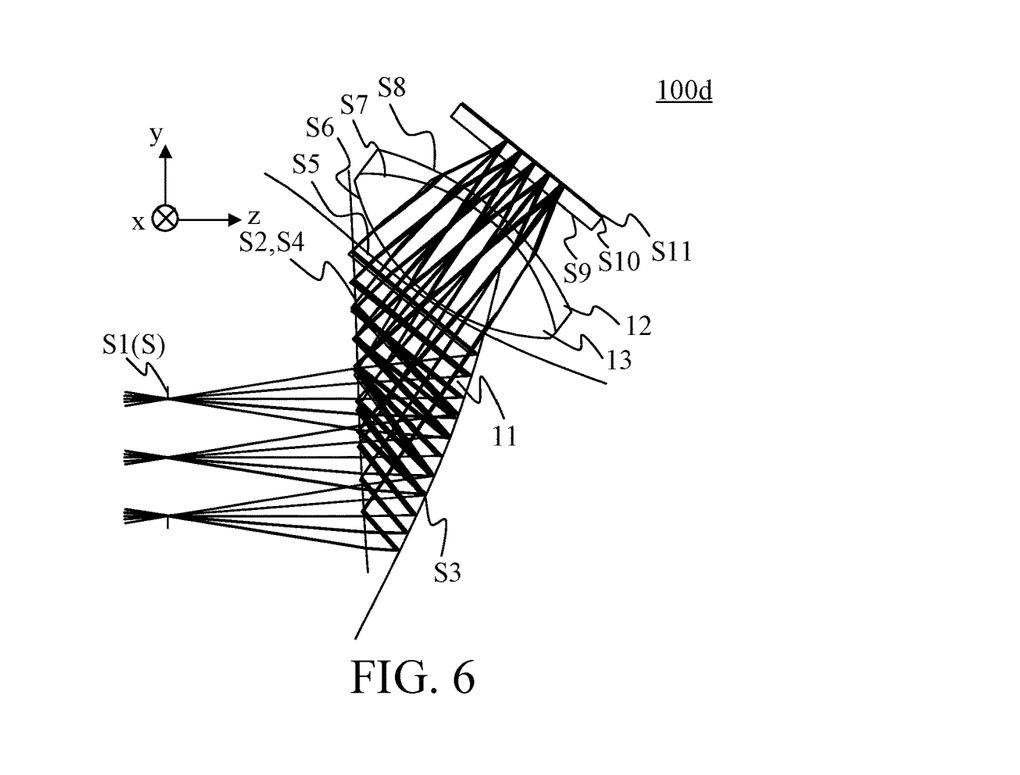
FIG. 6 is a sectional view of an observation apparatus according to Example 3.

FIG. 6 is a sectional view of an observation apparatus 100d according to Example 3. The observation apparatus 100d according to this example includes the optical element 11, the convex lens 13, the concave lens 12, and the image display element 2 arranged in this order. The convex lens 13 is disposed closer to the optical element 11 than the concave lens 12 (or the convex lens 13 is disposed between the optical element 11 and the concave lens 12). Thereby, since the principal point position of the lens system including the concave lens 12 and the convex lens 13 is disposed at the front in the lens, it becomes easy to increase the power of the entire observation optical system. The convex lens 13 and the concave lens 12 form a cemented lens in which the convex lens 13 and the concave lens 12 are cemented. The convex lens 13 and the concave lens 12 that are cemented achieve the miniaturization, and relieve the performance deterioration caused by the light beam shielding due to the total reflection and the shape error of the cemented surface.

Figure 7:
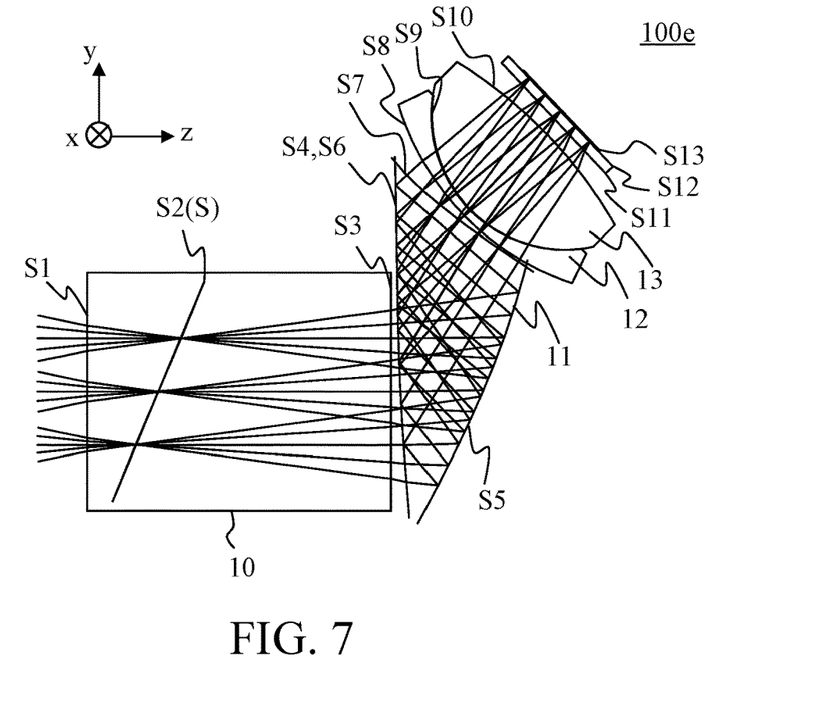
FIG. 7 is a sectional view of an observation apparatus according to Example 4.

FIG. 7 is a sectional view of an observation apparatus 100e according to the fourth embodiment. The observation apparatus 100e according to this example is different from that of another example in that a surface S2 corresponding to the exit pupil S is eccentric, surfaces S1 and S3 corresponding to the exit and entrance surfaces of the light guide plate 10 are provided before and after it, respectively, and it is filled with a medium having a ratio n>1. The observation apparatus 100e includes the optical element 11, the concave lens 12, the convex lens 13, and the image display element 2 arranged in this order. The concave lens 12 is disposed closer to the optical element 11 than the convex lens 13 (or the concave lens 12 is disposed between the optical element 11 and the convex lens 13). Thereby, the principal point position of the lens system including the concave lens 12 and the convex lens 13 is disposed at the back the lens, so that it becomes easy to secure a space between the convex lens 13 and the image display element 2. The convex lens 13 and the concave lens 12 form a cemented lens in which the convex lens 13 and the concave lens 12 are cemented. Cementing the concave lens 12 and the convex lens 13 can provide a compact configuration and relieve the performance deterioration caused by the light beam shielding due to the total reflection and the shape error of the cemented surface.

Figure 8:
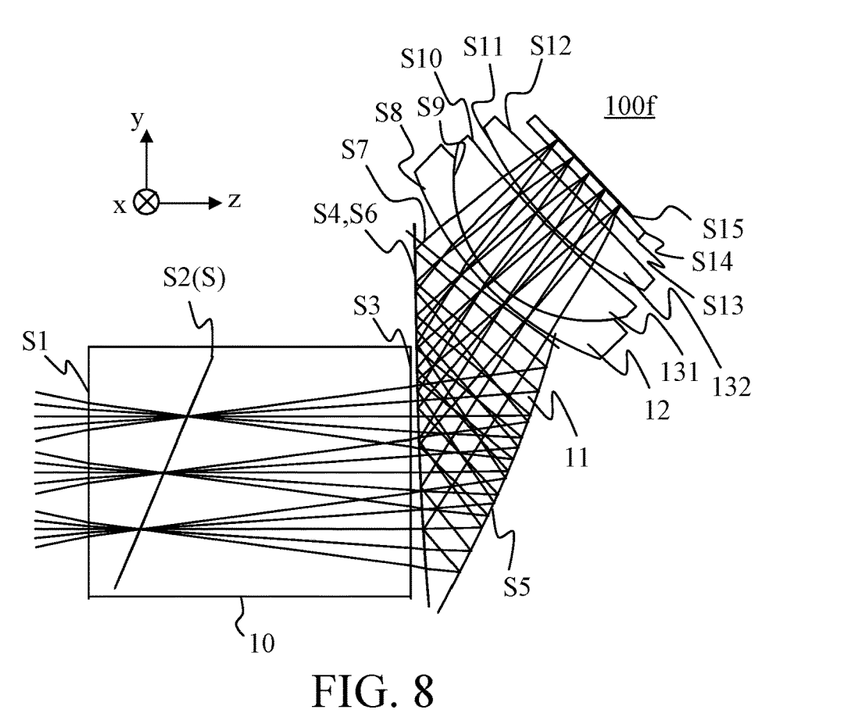
FIG. 8 is a sectional view of an observation apparatus according to Example 5.
Figure 9:
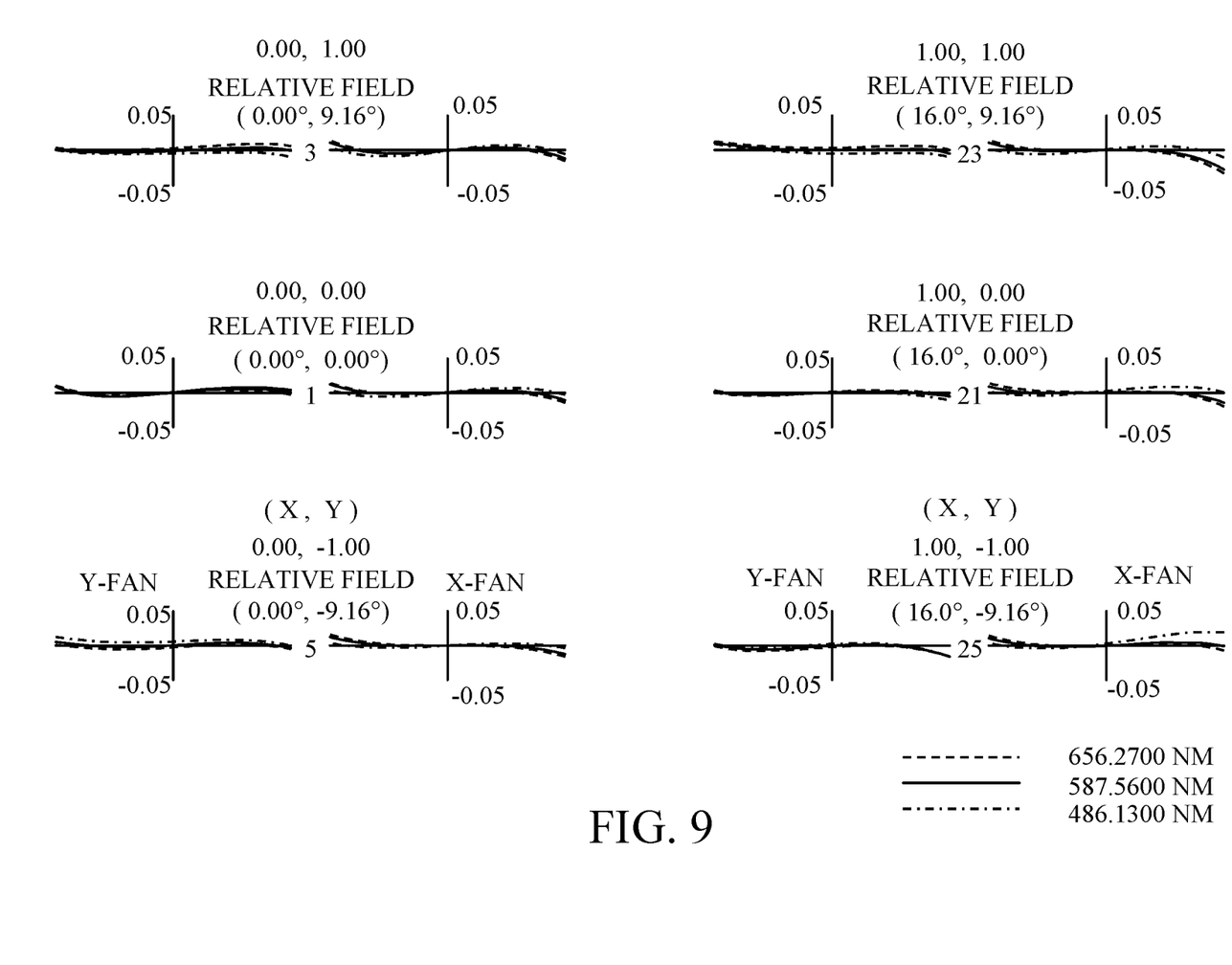
FIG. 9 is a lateral aberration diagram in the observation optical system according to Example 1.
Figure 10:
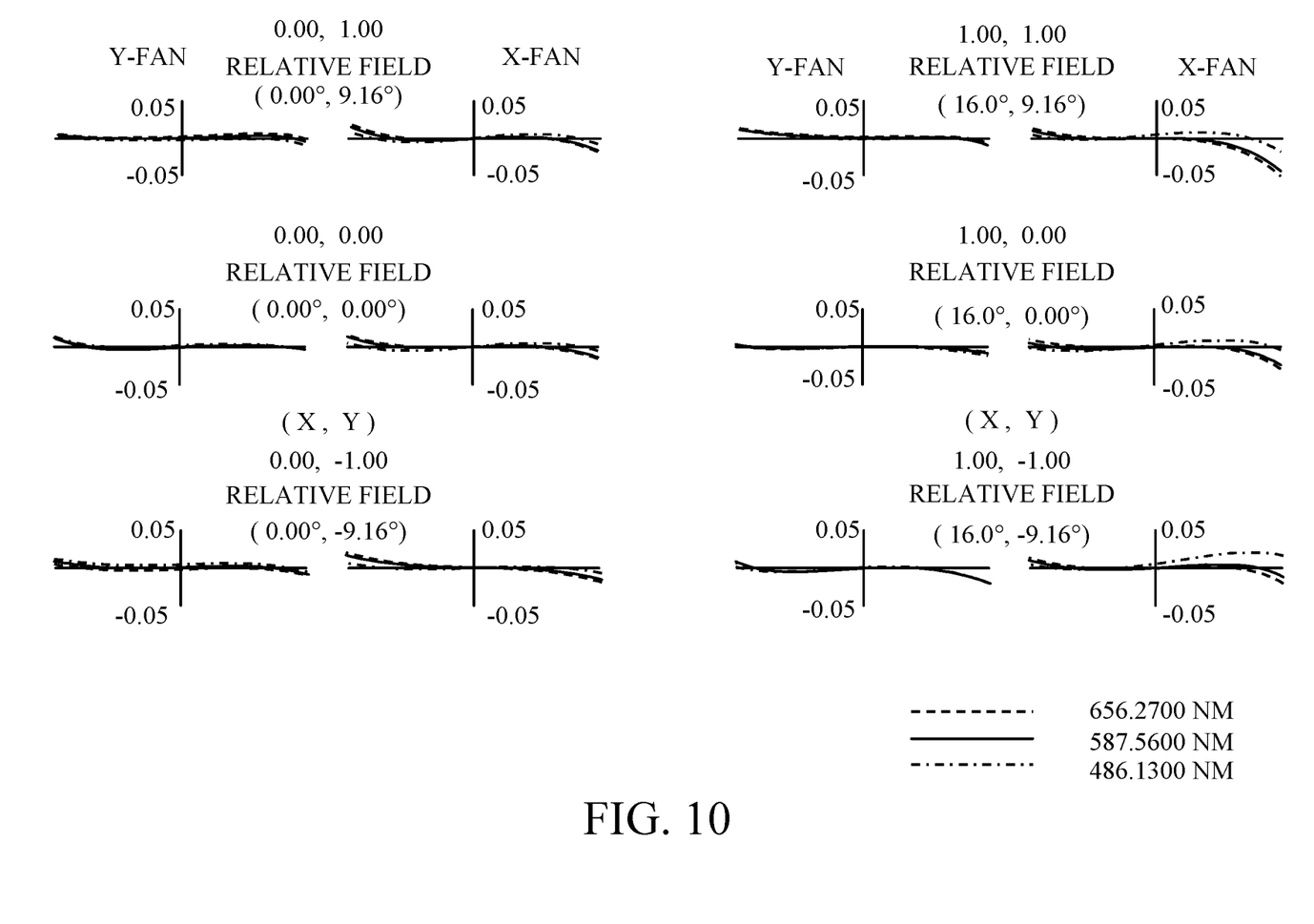
FIG. 10 is a lateral aberration diagram in the observation optical system according to Example 2.
Figure 11:
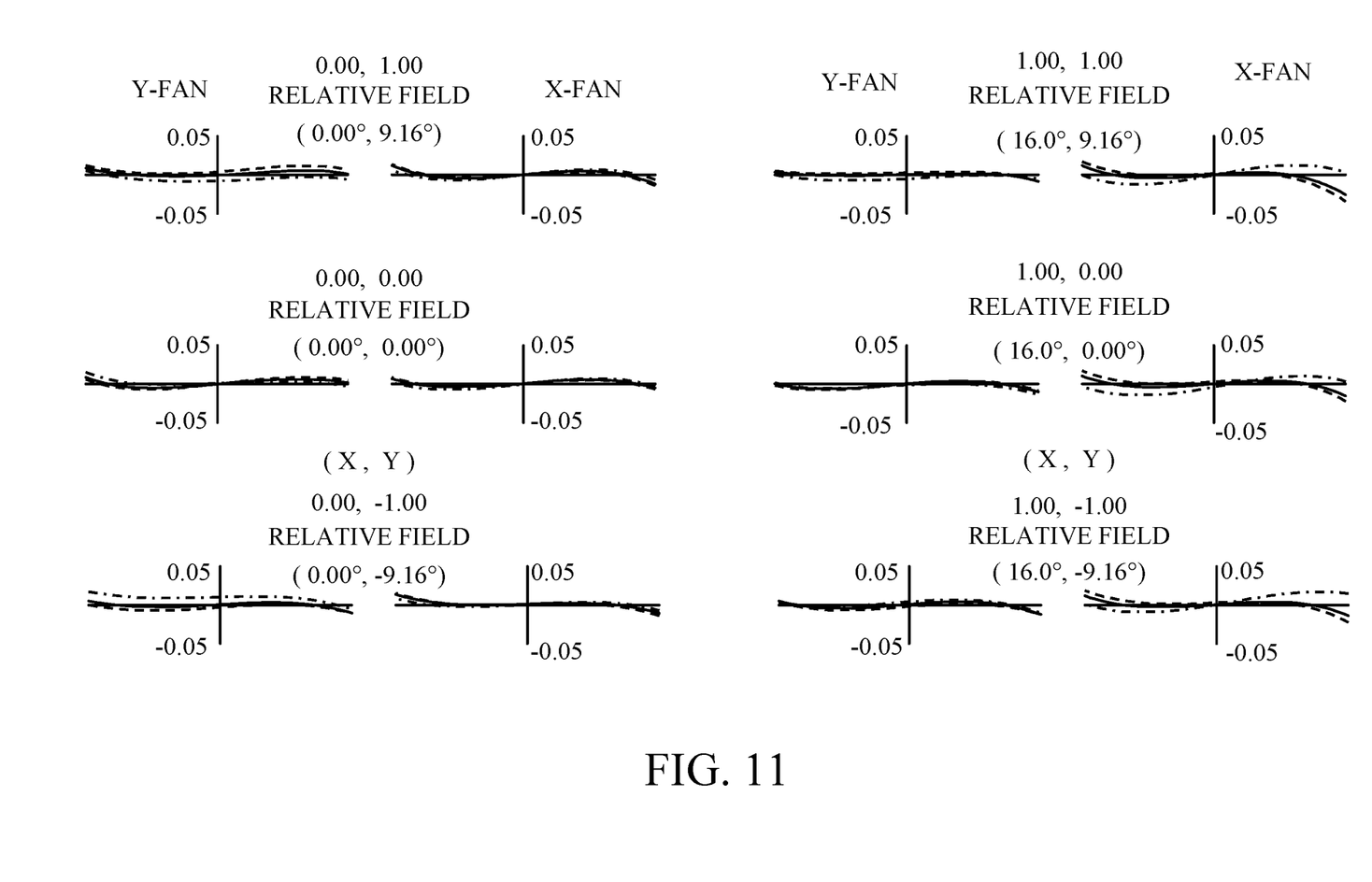
FIG. 11 is a lateral aberration diagram in the observation optical system according to Example 3.
Figure 12:
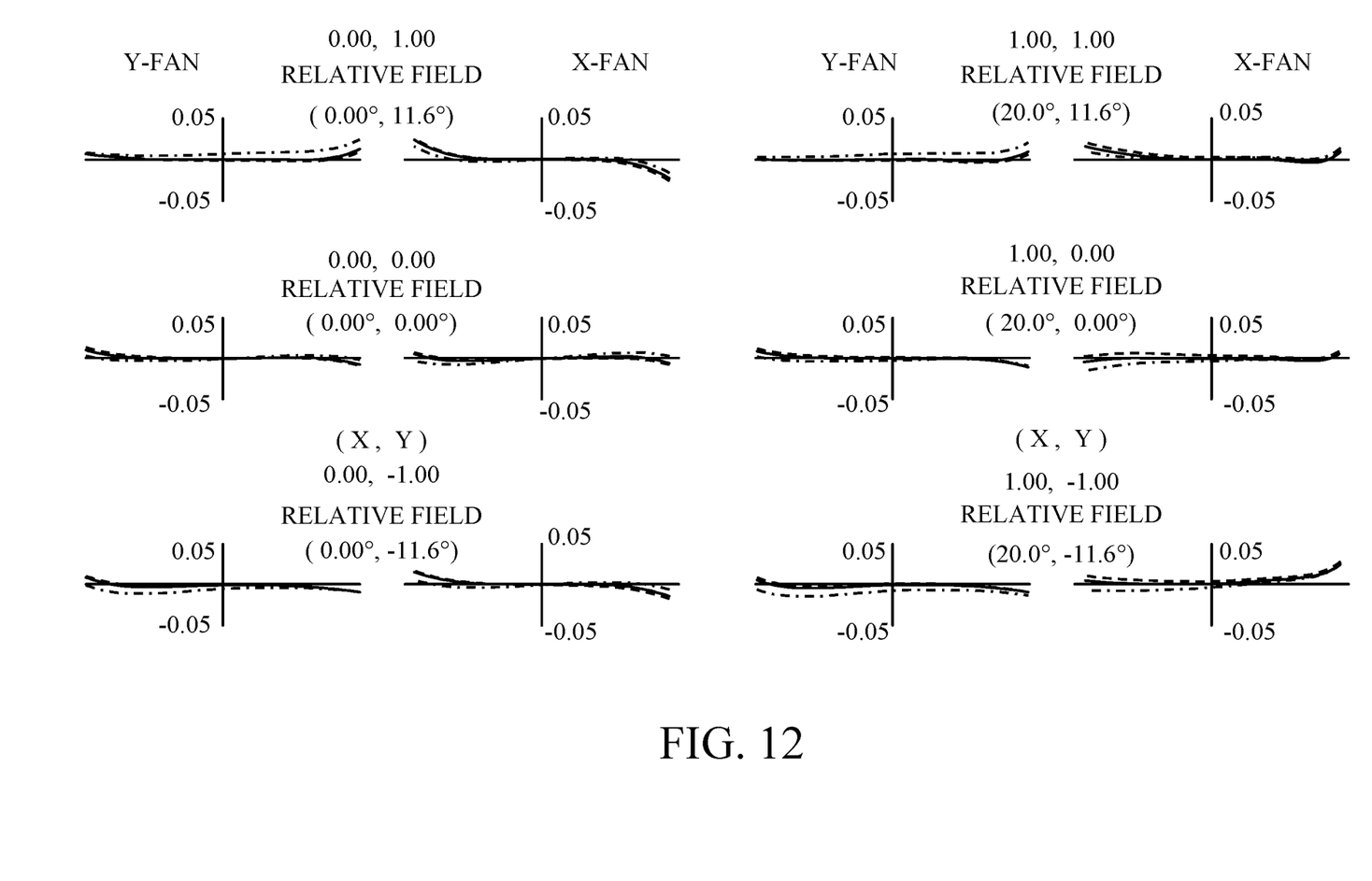
FIG. 12 is a lateral aberration diagram in the observation optical system according to Example 4.
Figure 13:
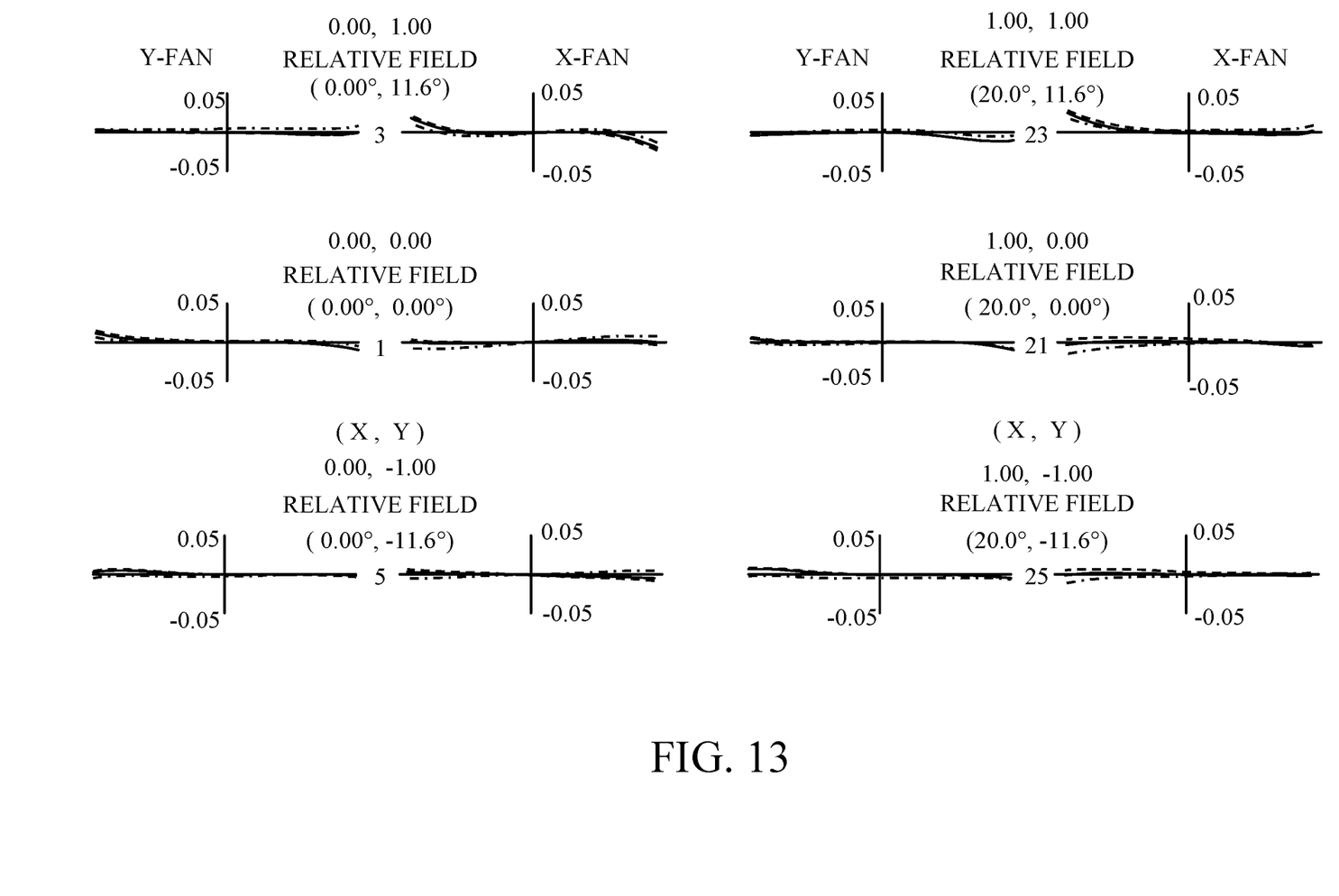
FIG. 13 is a lateral aberration diagram in the observation optical system according to Example 5.

FIG. 8 is a sectional view of an observation apparatus 100f according to the fifth embodiment. The observation apparatus 100f according to this example differs from that of the fourth embodiment in that it has two convex lenses 131 and 132 instead of one convex lens 13. The observation apparatus 100f according to this example includes the optical element 11, the concave lens 12, the convex lens 131, the convex lens 132, and the image display element 2 arranged in this order. The concave lens 12 is disposed closer to the optical element 11 than the convex lenses 131 and 132 (or the concave lens 12 is disposed between the optical element 11 and the convex lenses 131 and 132). Thereby, the principal point position of the lens system including the concave lens 12 and the convex lenses 131 and 132 is disposed at the back of the lens, so that it becomes easy to secure a space between the convex lens 13 and the image display element 2. The convex lens 131 and the concave lens 12 form a cemented lens in which the convex lens 131 and the concave lens 12 are cemented. Cementing the concave lens 12 and the convex lens 131 can achieve the miniaturization and relieve the performance deterioration caused by the light beam shielding due to the total reflection and the shape error of the cemented surface.

In this example, the conditional expressions (1) and (2) may be satisfied for the set of the concave lens 12 and the convex lens 131 or at least one of the set of the concave lens 12 and the convex lens 131 and the set of the concave lens 12 and the convex lens 132. In the following Numerical Example 6 corresponding to this example, the conditional expressions (1) and (2) are not satisfied by the set of the concave lens 12 and the convex lens 131, but are satisfied by the set of the concave lens 12 and the convex lens 132.

On the other hand, the conditional expressions (3) and (4) are calculated by setting the sum of the convex lens 131 and the convex lens 132 to φp/np and φp/vp. In other words, φp/np may be calculated as follows:

$$\varphi p/np = \varphi p1/np1 + \varphi p2/np2$$

where φp1 is a refractive power of the convex lens 131, np1 is a refractive index of the medium, φp2 is a refractive power of the convex lens 132, and np2 is a refractive index of the medium. Similarly, φp/vp may be calculated as follows:

$$\varphi p/vp = \varphi p1/vp1 + \varphi p2/vp2$$

where vp1 is an Abbe number of the medium of the convex lens 131, and vp2 is an Abbe number of the medium of the convex lens 132.

When the observation optical system has three or more convex lenses, the conditional expressions (3) and (4) may be similarly calculated as follows:

$$\varphi p/np = \varphi p1/np1 + \varphi p2/np2 + \varphi p3/np3 + \ldots$$

$$\varphi p/vp = \varphi p1/vp1 + \varphi p2/vp2 + \varphi p3/vp3 + \ldots$$

When the observation optical system has a plurality of concave lenses, they may be similarly calculated as follows:

$$\varphi n/nn = \varphi n1/nn1 + \varphi n2/nn2 + \ldots,$$

$$\varphi n/vn = \varphi n1/vn1 + \varphi n2/vn2 + \ldots$$

FIGS. 9, 10, 11, 12, and 13 are lateral aberration diagrams of the observation optical systems according to Numerical Examples 1 to 5 corresponding to Examples 1 to 5, respectively. As illustrated in FIGS. 9 to 13, the observation optical system according to each example is an optical system having small amounts of the curvature of field and he lateral chromatic aberration.

Tables 1 to 15 show data of Numerical Examples 1 to 5 corresponding to Examples 1 to 5, respectively. In each data, SUR represents a surface number attached after S, RDY represents a radius of curvature of that surface, and THI represents a surface difference (separation) from that surface to the next surface. As will be described later, the description of THI is omitted when the reference coordinate value of the surface is shown in the GLO term and the subsequent Y, Z, and A. Nd and Vd respectively indicate the refractive index and Abbe number of the medium subsequent to the surface, and the medium after the surface is air unless otherwise specified. When the surface is a reflection surface, the positive and negative signs of Nd change before and after the surface. GLO represents a reference point of the coordinate, and a portion beginning with G is based on the coordinate of the surface with the subsequent number. Y, Z, and A represent y and z coordinate values of the surface vertex coordinate system that defines each surface, and a rotation a that is a rotation angle around the x axis (with a unit of degree that sets a counterclockwise direction to a positive direction). The GLO term starting with G represents the y and z positions and rotation a in the coordinate system of the surface having that number. The GLO terms having no G represents the y and z positions and rotation a of the surface relative to the front surface. The TYP term starting with FFS represents the shape obtained by adding the aspherical coefficient of the subsequent number to the base shape of the radius of curvature expressed by RDY (0 when the RDY term is ∞).

The FFS plane according to each example has a symmetrical shape with respect to the YZ section, and thus has a rotationally asymmetric surface represented by:

$$z = Y*y + X2*x^2 + Y2*y^2 + X2Y*x^2*y + Y3*y^3 + X4*x^4 + X2Y2*x^2*y^2 + Y4*y^4 + \ldots$$

In each numerical example, each numerical value of the conditional expressions (1) to (4) is shown.

NUMERICAL EXAMPLE 1

TABLE 1

| SUR | RDY | THI | Nd | Vd | GLO | Y | Z | A | TYP |
|---|---|---|---|---|---|---|---|---|---|
| S1 | ∞ | | | | | 0.000 | 0.000 | 0.000 | |
| S2 | −42.539 | | 1.5709 | 33.80 | G1 | 5.540 | 12.854 | 1.809 | FSS1 |
| S3 | ∞ | | 1.5709 | 33.80 | G1 | 0.000 | 18.378 | −22.540 | FSS2 |
| S4 | −42.539 | | 1.5709 | 33.80 | G1 | 5.540 | 12.854 | 1.809 | FSS1 |
| S5 | ∞ | | | | G1 | 11.167 | 17.798 | 55.227 | FSS3 |
| S6 | 21.081 | 0.7 | 1.9591 | 17.47 | G1 | 11.450 | 17.995 | 45.618 | |
| S7 | 11.480 | 0.303 | | | | | | | |
| S8 | 12.000 | 5.599 | 1.5378 | 74.70 | | | | | |
| S9 | −16.036 | 1.777 | | | | | | | |
| S10 | ∞ | 1.1 | 1.5163 | 64.14 | | | | 1.158 | |
| S11 | ∞ | 0.05 | | | | | | | |
| S12 | ∞ | | | | | | | | |

TABLE 2

| FSS1 | | | | |
|---|---|---|---|---|
| X2: | 1.01250E−03 | Y2: | 1.43310E−02 | X2Y: | −6.48360E−04 |
| Y3: | −7.77060E−05 | X4: | −4.70750E−06 | X2Y2: | −1.41390E−05 |
| Y4: | 5.08590E−07 | | | | |
| FSS2 | | | | |
| X2: | −1.44450E−02 | Y2: | −5.44430E−03 | X2Y: | −1.93510E−04 |
| Y3: | −1.54480E−04 | X4: | −4.26190E−06 | X2Y2: | 5.20380E−06 |
| Y4: | 6.22060E−06 | | | | |
| FSS3 | | | | |
| X2: | −9.75750E−03 | Y2: | −4.50810E−03 | X2Y: | −1.18910E−03 |
| Y3: | 1.27510E−04 | X4: | 9.26130E−05 | X2Y2: | 1.12430E−04 |
| Y4: | 2.03120E−05 | | | | |

TABLE 3

| nn − np | 0.4213 |
|---|---|
| vp − vn | 57.23 |
| (φp/np + φn/nn)/Φ | 0.3950 |
| (φp/vp + φv/vn)/Φ | −0.01550 |

NUMERICAL EXAMPLE 2

TABLE 4

| SUR | RDY | THI | Nd | Vd | GLO | Y | Z | A | TYP |
|---|---|---|---|---|---|---|---|---|---|
| S1 | ∞ | | | | | | | | |
| S2 | −42.538 | | 1.5709 | 33.80 | G1 | 5.528 | 12.854 | 1.811 | FSS1 |
| S3 | ∞ | | 1.5709 | 33.80 | G1 | 0.000 | 18.378 | −22.546 | FSS2 |
| S4 | −42.538 | | 1.5709 | 33.80 | G1 | 5.528 | 12.854 | 1.811 | FSS1 |
| S5 | ∞ | | | | G1 | 11.163 | 17.806 | 55.246 | FSS3 |
| S6 | 21.081 | 0.7 | 1.9591 | 17.47 | G1 | 11.456 | 17.987 | 45.633 | |
| S7 | 10.516 | 5.599 | 1.5952 | 67.74 | | | | | |
| S8 | −16.036 | 1.609 | | | | | | | |
| S9 | ∞ | 1.1 | 1.5163 | 64.14 | | | | 1.107 | |
| S10 | ∞ | 0.05 | | | | | | | |
| S11 | ∞ | 0 | | | | | | | |

TABLE 5

| FSS1 | | | | |
|---|---|---|---|---|
| X2: | 8.89520E−04 | Y2: | 1.44370E−02 | X2Y: | −7.17270E−04 |
| Y3: | −8.03770E−05 | X4: | −6.15450E−06 | X2Y2: | −1.69020E−05 |
| Y4: | 3.14710E−07 | | | | |

TABLE 5-continued

| FSS2 | | | | |
|---|---|---|---|---|
| X2: | −1.45690E−02 | Y2: | −5.65430E−03 | X2Y: | −2.17680E−04 |
| Y3: | −1.63160E−04 | X4: | −4.37880E−06 | X2Y2: | 6.14560E−06 |
| Y4: | 6.25730E−06 | | | | |
| FSS3 | | | | |
| X2: | −1.13410E−02 | Y2: | −2.28800E−03 | X2Y: | −1.43290E−03 |
| Y3: | 1.19940E−04 | X4: | 1.10440E−04 | X2Y2: | 1.34110E−04 |
| Y4: | 3.17380E−05 | | | | |

TABLE 6

| nn − np | 0.3638 |
|---|---|
| vp − vn | 50.26 |
| (φp/np + φn/nn)/Φ | 0.4149 |
| (φp/vp + φv/vn)/Φ | −0.01650 |

NUMERICAL EXAMPLE 3

TABLE 7

| SUR | RDY | THI | Nd | Vd | GLO | Y | Z | A | TYP |
|---|---|---|---|---|---|---|---|---|---|
| S1 | ∞ | | | | | | | | |
| S2 | −39.773 | | 1.5709 | 33.80 | G1 | 5.838 | 13.128 | 1.928 | FSS1 |
| S3 | ∞ | | −1.5709 | 33.80 | G1 | 0 | 18.952 | −22.534 | FSS2 |
| S4 | −39.773 | | 1.5709 | 33.80 | G1 | 5.838 | 13.128 | 1.928 | FSS1 |
| S5 | ∞ | | | | G1 | 11.032 | 17.656 | 55.219 | FSS3 |
| S6 | 14.142 | 6.667 | 1.5378 | 74.70 | G1 | 11.26 | 17.814 | 51.377 | |
| S7 | −13.332 | 0.7 | 1.9591 | 17.47 | | | | 1.156 | |
| S8 | −20.076 | 3.123 | | | | | | | |
| S9 | ∞ | 1.1 | 1.5163 | 64.14 | | | | 1.158 | |
| S10 | ∞ | 0.05 | | | | | | | |
| S11 | ∞ | 0 | | | | | | | |

TABLE 8

| FSS1 | | | | | |
|---|---|---|---|---|---|
| X2: | 1.15590E−03 | Y2: | 1.30800E−02 | X2Y: | −5.27980E−04 |
| Y3: | −8.35340E−05 | X4: | −1.60490E−06 | X2Y2: | −8.38120E−06 |
| Y4: | 9.61100E−07 | | | | |
| FSS2 | | | | | |
| X2: | −1.35580E−02 | Y2: | −6.24750E−03 | X2Y: | −1.42130E−04 |
| Y3: | −1.10180E−04 | X4: | −3.31930E−06 | X2Y2: | 1.86870E−06 |
| Y4: | 3.25970E−06 | | | | |
| FSS3 | | | | | |

TABLE 8-continued

| X2: | 6.10840E−03 | Y2: | 1.23740E−02 | X2Y: | −9.99100E−04 |
|---|---|---|---|---|---|
| Y3: | −3.18400E−04 | X4: | −6.87750E−06 | X2Y2: | −6.12390E−05 |
| Y4: | −2.44490E−05 | | | | |

TABLE 9

| nn − np | 0.4213 |
|---|---|
| vp − vn | 57.23 |
| (φp/np + φn/nn)/Φ | 0.5242 |
| (φp/vp + φv/vn)/Φ | −0.0053 |

NUMERICAL EXAMPLE 4

TABLE 10

| SUR | RDY | THI | Nd | Vd | GLO | Y | Z | A | TYP |
|---|---|---|---|---|---|---|---|---|---|
| S1 | ∞ | | 1.5163 | 64.14 | | 0 | 0 | 0 | |
| S2 | ∞ | | 1.5163 | 64.14 | G1 | 0 | 5 | −23 | |
| S3 | ∞ | | | | G1 | 0 | 21.3 | 0 | |
| S4 | ∞ | | 1.5709 | 33.8 | G1 | 6.272 | 21.736 | 1.1839 | FFS1 |
| S5 | ∞ | | −1.5709 | 33.8 | G1 | 0 | 27.691 | −23.244 | FFS2 |
| S6 | ∞ | | 1.5709 | 33.8 | G1 | 6.272 | 21.736 | 1.1839 | FFS1 |
| S7 | ∞ | | | | G1 | 11.603 | 26.393 | 53.426 | FFS3 |
| S8 | 18.671 | 0.6 | 1.9861 | 16.48 | G1 | 12.233 | 26.344 | 44.546 | |
| S9 | 9.287 | 7.5 | 1.6968 | 55.53 | | | | | |
| S10 | −31.929 | 1.1 | | | | | | | |
| S11 | ∞ | 0.7 | 1.5163 | 64.14 | | | | −0.960 | |
| S12 | ∞ | 0.07 | | | | | | | |
| S13 | ∞ | 0 | | | | | | | |

TABLE 11

| FSS1 | | | | | |
|---|---|---|---|---|---|
| X2: | −8.36160E−03 | Y2: | 1.35180E−03 | X2Y: | −5.25880E−04 |
| Y3: | −9.30450E−05 | X4: | −1.31050E−05 | X2Y2: | −2.45590E−05 |
| Y4: | −4.13130E−07 | X4Y: | 1.97830E−06 | X2Y3: | −8.40540E−07 |
| Y5: | 1.44420E−10 | X6: | 4.86530E−09 | X4Y2: | −1.20490E−07 |
| X2Y4: | −1.63390E−08 | Y6: | −9.29670E−09 | | |
| FSS2 | | | | | |
| Y: | 4.28400E−03 | X2: | −1.25360E−02 | Y2: | −6.97650E−03 |
| X2Y: | −1.82440E−04 | Y3: | −1.44440E−04 | X4: | −3.35500E−06 |
| X2Y2: | 2.63190E−07 | Y4: | 3.60360E−06 | X4Y: | 1.21150E−06 |
| X2Y3: | 1.77710E−07 | Y5: | −3.60630E−07 | X6: | −1.31560E−07 |
| X4Y2: | −3.13570E−07 | X2Y4: | −5.22560E−08 | Y6: | −2.41770E−08 |
| X6Y: | −6.35560E−09 | X4Y3: | 1.36560E−09 | X2Y5: | −6.63870E−09 |
| Y7: | 3.65470E−09 | X8: | 2.31380E−09 | X6Y2: | 1.67480E−09 |
| X4Y4: | 2.59310E−09 | X2Y6: | 9.76190E−10 | Y8: | −1.45360E−11 |

TABLE 11-continued

| FSS3 | | | | | |
|---|---|---|---|---|---|
| X2: | −2.25760E−02 | Y2: | 8.97110E−03 | X2Y: | −2.39400E−04 |
| Y3: | 2.37510E−04 | X4: | 1.09240E−05 | X2Y2: | −1.29670E−04 |
| Y4: | 2.95150E−05 | X4Y: | 5.55250E−06 | X2Y3: | −9.51400E−06 |
| Y5: | 9.90690E−06 | X6: | 5.69480E−08 | X4Y2: | 1.31780E−06 |
| X2Y4: | 3.39170E−07 | Y6: | −2.62970E−07 | | |

TABLE 12

| | |
|---|---|
| nn − np | 0.2893 |
| vp − vn | 39.05 |
| (φp/np + φn/nn)/Φ | 0.4022 |
| (φp/vp + φv/vn)/Φ | −0.02284 |

NUMERICAL EXAMPLE 5

TABLE 13

| SUR | RDY | THI | Nd | Vd | GLO | Y | Z | A | TYP |
|---|---|---|---|---|---|---|---|---|---|
| S1 | ∞ | | 1.5163 | 64.14 | | 0 | 0 | 0 | |
| S2 | ∞ | | 1.5163 | 64.14 | G1 | 0 | 5 | −23 | |
| S3 | ∞ | | | | G1 | 0 | 21.3 | 0 | |
| S4 | ∞ | | 1.5709 | 33.8 | G1 | 6.2725 | 21.736 | 1.1839 | FFS1 |
| S5 | ∞ | | −1.5709 | 33.8 | G1 | 0 | 27.691 | −23.244 | FFS2 |
| S6 | ∞ | | 1.5709 | 33.8 | G1 | 6.2725 | 21.736 | 1.1839 | FFS2 |
| S7 | ∞ | | | | G1 | 11.603 | 26.393 | 53.426 | FFS3 |
| S8 | 20.571 | 0.6 | 1.9861 | 16.48 | G1 | 12.233 | 26.344 | 44.920 | |
| S9 | 9.1362 | 5 | 1.8061 | 40.93 | | 0 | 0 | 0 | |
| S10 | 65.745 | 0.2 | 1 | 0 | | 0 | 0 | 0 | |
| S11 | 21.576 | 2.5 | 1.4388 | 94.66 | | 0 | 0 | 0 | |
| S12 | −182.14 | 1 | 1 | 0 | | 0 | 0 | 0 | |
| S13 | ∞ | 0.7 | 1.5163 | 64.14 | | 0 | 0 | −1.0927 | |
| S14 | ∞ | 0.07 | | | | | | | |
| S15 | ∞ | 0 | | | | | | | |

TABLE 14

| FSS1 | | | | | |
|---|---|---|---|---|---|
| X2: | −8.36160E−03 | Y2: | 1.35180E−03 | X2Y: | −5.25880E−04 |
| Y3: | −9.30450E−05 | X4: | −1.31050E−05 | X2Y2: | −2.45590E−05 |
| Y4: | −4.13130E−07 | X4Y: | 1.97830E−06 | X2Y3: | −8.40540E−07 |
| Y5: | 1.44420E−10 | X6: | 4.86530E−09 | X4Y2: | −1.20490E−07 |
| X2Y4: | −1.63390E−08 | Y6: | −9.29670E−09 | | |
| FSS2 | | | | | |
| Y: | 4.28400E−03 | X2: | −1.25360E−02 | Y2: | −6.97650E−03 |
| X2Y: | −1.82440E−04 | Y3: | −1.44440E−04 | X4: | −3.35500E−06 |
| X2Y2: | 2.63190E−07 | Y4: | 3.60360E−06 | X4Y: | 1.21150E−06 |
| X2Y3: | 1.77710E−07 | Y5: | −3.60630E−07 | X6: | −1.31560E−07 |
| X4Y2: | −3.13570E−07 | X2Y4: | −5.22560E−08 | Y6: | −2.41770E−08 |
| X6Y: | −6.35560E−09 | X4Y3: | 1.36560E−09 | X2Y5: | −6.63870E−09 |
| Y7: | 3.65470E−09 | X8: | 2.31380E−09 | X6Y2: | 1.67480E−09 |
| X4Y4: | 2.59310E−09 | X2Y6: | 9.76190E−10 | Y8: | −1.45360E−11 |
| FSS3 | | | | | |
| X2: | −2.25760E−02 | Y2: | 8.97110E−03 | X2Y: | −2.39400E−04 |
| Y3: | 2.37510E−04 | X4: | 1.09240E−05 | X2Y2: | −1.29670E−04 |
| Y4: | 2.95150E−05 | X4Y: | 5.55250E−06 | X2Y3: | −9.51400E−06 |
| Y5: | 9.90690E−06 | X6: | 5.69480E−08 | X4Y2: | 1.31780E−06 |
| X2Y4: | 3.39170E−07 | Y6: | −2.62970E−07 | | |

TABLE 15

| | 12ζ 132 |
|---|---|
| nn − vp | 0.5474 |
| vp − vn | 78.18 |
| (φp/np + φn/nn)/Φ | 0.4396 |
| (φp/vp + φn/vn)/Φ | −0.02010 |

Each embodiment can provide a compact observation optical system and a display apparatus, each of which can satisfactorily correct the chromatic aberration and the curvature of field while preventing an unnecessary pattern from being observed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-138509, filed on Jul. 29, 2019, which is hereby incorporated by reference herein in its entirety.

What is claimed is:

1. An optical system configured to guide a light beam from a display element, the optical system comprising:
    a positive lens;
    a negative lens; and
        an optical element having a transmission surface, an optical surface, and a reflection and transmission surface,
        wherein the light beam from the display element;
            passes through the positive lens, the negative lens, and then the transmission surface;
            then reflects on the reflection and transmission surface and then on the optical surface;
            then passes through the reflection and transmission surface; and
        then travels to an exit pupil, and
    wherein the following inequalities are satisfied:

$0.28 < nn-np < 0.60$ $50.26 \leq vp-vn < 80$ where np and nn are refractive indices of the positive lens and the negative lens for the d-line, respectively, and vp and vn are Abbe numbers of the positive lens and the negative lens for the d-line, respectively.

2. The optical system according to claim 1, wherein the optical system guides the light beam to the exit pupil without forming an intermediate image.

3. The optical system according to claim 1, wherein the following conditional expressions are satisfied:

$0.0 < (\varphi p/np + \varphi n/nn)/\Phi < 0.6$ $-0.03 < (\varphi p/vp + \varphi n/vn)/\Phi < 0.00$ where $\varphi p$ and $\varphi n$ are powers of the positive lens and the negative lens, respectively, and $\Phi$ is a power of the optical system.

4. The optical system according to claim 1, wherein the positive lens and the negative lens are cemented to each other.

5. The optical system according to claim 1, wherein the negative lens is disposed between the positive lens and the optical element.

6. A display apparatus comprising:
    a display element; and
    an optical system according to claim 1.

7. The optical system according to claim 1, wherein the following inequality is satisfied:

$0.4213 \leq nn-np < 0.60$.

8. The optical system according to claim 1, wherein the number of lenses arranged between the display element and the transmission surface is three or less.

* * * * *